INVENTOR
MONROE H. SWEET
ATTORNEYS

Aug. 21, 1956   M. H. SWEET   2,759,392
COLOR TEMPERATURE METER AND COLOR ANALYZER
Original Filed April 23, 1949   2 Sheets-Sheet 2

X OR Y
COEFFICIENT

DEGREES
KELVIN

INVENTOR
MONROE H. SWEET

ATTORNEYS

United States Patent Office 2,759,392
Patented Aug. 21, 1956

2,759,392
COLOR TEMPERATURE METER AND COLOR ANALYZER

Monroe H. Sweet, Binghamton, N. Y., assignor to General Aniline & Film Corporation, New York, N. Y., a corporation of Delaware Original application April 23, 1949, Serial No. 89,339, now Patent No. 2,648,253, dated August 11, 1953. Divided and this application January 4, 1952, Serial No. 264,945

2 Claims. (Cl. 88—14)

This invention relates to color temperature meters and color analyzers. In the past the measurement of color temperature has been accomplished by various means, particularly ocular type meters and several devices employing photoelectric elements. The ocular measurement of color temperature has the disadvantage of depending upon human vision which is subject to peculiarities in different individuals, and also relies upon individual appreciation of color which is always open to the vagaries of human judgment.

There have been color temperature meters which function on the principle of scanning the light source with photoelectric tubes of particular spectral response characteristics connected to instruments for indicating the difference in the red and blue photocurrents. These instruments have certain advantages over the ocular types, but have the drawback that they do not indicate directly the color temperature, and require manual balancing and skilled operation before a representative value of the color temperature itself can be determined.

The foremost disadvantage of prior color temperature measuring instruments is their susceptibility to overall light intensity changes. This necessitates a careful readjustment of the threshold value of light intensity or a compensation for a light intensity over or below the value for which the instrument is originally calibrated.

The primary object of this invention is to devise a practical arrangement for indicating directly chromatic values, such as the color temperature of an incandescent body in standard units of measurement.

Another equally important object of this invention is to devise a measuring instrument which will indicate directly the values for determining chromaticity by the tristimulus system of colorimetry of the transmittance or reflectance of various materials.

It is also an object of the invention to devise an instrument which shall indicate directly the color temperature of the source regardless of variations in the intensity of illumination at the source.

A particular advantage of the method and apparatus in accordance with the invention is the simplicity of the component elements and the rapid indication of the desired information.

Another advantage residing in the arrangement herein described is a dual function of utility requiring only a simple operation, namely, the replacement of filters to change over from color temperature measurement to trichromatic coefficient determination.

Other objects and advantages will be apparent from the following description of the invention, pointed out in particularity in the appended claims, and taken in connection with the accompanying drawing, in which:

Figure 1:
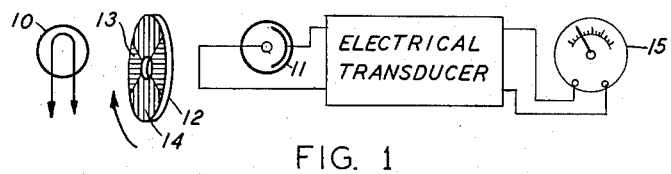
Figure 1 is a diagrammatic view showing the general relation of the basic elements of the measuring arrangement.

The measuring arrangement is based on the theory of the optical two-color method of determining color temperature. Essentially, the ratio of the red-to-blue radiation is measured. Since, for black body radiation, the red-to-blue ratio does not vary throughout different ranges of intensity as long as the color temperature remains the same, an instrument which will indicate directly the red-to-blue ratio independently of the actual intensity of the light is much to be desired in the art.

The method and apparatus hereinafter to be described in detail accomplish direct indication of color temperature by virtue of the fact that distinct spectral energy bands are selected from the light source under analysis, and these bands are successively and recurrently transmitted onto a photoelectric device which produces an alternating potential in accordance with the intensity of the selected bands, and at a frequency depending upon the rate of the successive recurrent transmission. The resultant alternating voltage is transformed into electrical magnitudes which represent the logarithm thereof and the ratio of these magnitudes is indicated on a meter scale directly in terms of color temperature.

The above method of operation is performed by the combination of simple mechanisms. The selection of distinct bands of spectral energy is advantageously performed by a color filter disk comprising sectors for transmitting, in a broad sense, monochromatic light. One sector of the disk is a blue filter, and the other a red filter. The disk is positioned to intercept the light from the source of illuminant under analysis and is rotated by means of a motor at the predetermined speed.

The term "monochromatic light" is not intended here to mean light of only a single wavelength, but is used inclusively to define light of a more or less narrow bandwidth representative of what the eye would perceive as a certain color, namely, blue or red. The blue may have various hues of blue within a defined range, and, similarly, the red would have various hues in a defined range.

The change of the voltage output of the photoelectric device, as utilized above, is effected by an electrical transducer which may be an amplifier having certain specific transfer characteristics. In the present case, this transfer characteristic is a logarithmic one whereby the output of the transducer is the logarithm of the input voltage. An electrical transducer may be defined as an electric network by means of which energy may flow from one or more transmission systems to one or more other transmission systems. Generally, an electrical transducer has four terminals, two taken as input and two as output and the network therein may have various transfer characteristics. A particular type of transducer which can very advantageously be used in this arrangement is a logarithmic amplifier of which certain preferred embodiments will be more extensively described in connection with the various figures.

The output of a logarithmic amplifier, as the name implies, is the logarithm of the input voltage and, since this voltage in the present arrangeemnt is the ratio of the blue and red intensities derived from the source, an indication of the logarithm of the ratio will be a direct function of the color temperature. Accordingly, a suitable electrical indicating instrument in the output of the amplifier may be calibrated in terms of color temperature, namely degrees of Kelvin.

At this point the distinguishing feature of this invention will be apparent. It is to be noted that by the use of a logarithmic transfer or amplification it is the logarithm of the ratio of response of the phototube to the selected band-widths that is indicated and not the response ratio itself. This is an important factor, and is instrumental in realizing the advantage that the instrument is unaffected by the overall changes in the intensity of the light source. If the voltage ratio is directly indicated without a logarithmic transfer the indication, unless based on a calibrated reference level, would vary over wide limits. As an example, we may assume that a light source has a color temperature which results in a voltage ratio of 6:2. This would give a meter indication of 3 volts. Now, if this instrument is placed closer to the source or the overall intensity thereof increases, let us say ten times that of the former voltage level, the ratio will be 60:20 and correspondingly the meter indication would be 30 volts instead of 3, which is a considerable error. Evidently such instruments of the prior art, operating on the blue-red intensity ratio principle, can be used only at a preset intensity level or at a fixed distance from the source since the change of distance would seriously affect the accuracy of the reading.

In the present case, in accordance with the present invention, the logarithmic transfer of the voltage ratio eliminates this disadvantage. The difference in the log of two numbers is the same as the log of the quotient obtained by dividing one by the other. Referring to the above example, log 6:2 equals log 6—log 2=.48 approximately, which is the same for all ratios giving the number 3 irrespective of the overall level, whether it is 60:20 or 600:200, etc., and the meter indication will be the same division on the scale which corresponds to log 3. From this, it is clear that the accuracy is unaffected by variations of intensity of the light source within a wide range of practical design requirements.

By change of filters in the rotating disk and other minor changes, the instrument may be used as a color analyzer. Colors of objects (chromaticity) may be represented by certain values or quantities termed "trichromatic coefficients" according to a method sponsored by the International Commission of Illumination. It is customary to indicate chromaticity by any two of the three color descriptive coefficients, preferably the $x$ and $y$ values. Of course, this applies to colors of objects viewed through or under a particular illuminant.

The photosensitive receiver, when provided with filters of proper transmission characteristics, is adapted to be used in determining the color of various objects. Instead of employing a disk with alternating red and blue filter sectors, one having opposite halves of differently colored filter material may be used. One half of the disk is used for determining the X tristimulus function while the other half is used in determining the $X+Y+Z$ function. A second disk of similar type has one filter sector similar to the sector above described, that is, for determining the $X+Y+Z$ function. The other half of this disk has a different transmission characteristic and is used to determine the Y tristimulus function.

The mathematical computations necessary to determine these values involve the division of one of the two terms by the $\Sigma(X+Y+Z)$. The subtraction of the logarithms of two numbers corresponds to the division of these numbers and, therefore, the instrument scale when calibrated in proper terms will show the $x$ or the $y$ coefficients directly.

A further illustration of the method and apparatus will now be given by referring to the various figures. The general arrangement of the essential parts is shown in Figure 1 comprising a light source 10 which is under analysis directed upon a photosensitive device 11 through a filter disk 12. The disk 12 comprises an even number of alternating differently colored filters 13 and 14 which have absorption and transmission characteristics dependent upon the purpose for which they are used, as will later be described in greater detail. The disk 12 is rotated at a predetermined speed by any suitable instrumentality not indicated here except by the arrow.

Light passing the filter elements is received by the photosensitive device 11 and the output voltage thereof is modulated by the intensity changes produced by the interposed filters. The output of the photosensitive device is applied to the input terminals of an electrical logarithmic transducer shown in block diagram and the voltage output thereof is applied to a suitable indicating instrument 15 having a scale calibrated in units selected, for example, for color temperature determination in degrees of Kelvin.

Figure 2:
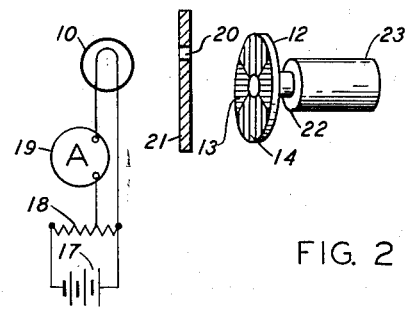
Figure 2 is a diagrammatic view showing the measuring arrangement in combination with a particular type of amplifier performing the function of the transducer.

The arrangement in Figure 2 is imilar to that in Figure 1. An incandescent lamp 10 forms the light source connected to a supply of electrical energy such as a battery 17 by means of potentiometer 18, for regulating the energizing current. The latter may be indicated on a meter 19 in series with the supply to the lamp 10. In this manner, the color temperature of the light source may be measured at various operating levels of incandescence in addition to its rated condition.

While no casing for the instrument has been shown, at some part thereof, there is provided an aperture 20 in one of the walls 21 of the casing through which the radiant energy to be measured passes. Just inside that wall and relatively close to the aperture 20 is the disk 12 embodying a plurality of sector-shaped filter elements, four such sectors being shown here although any even number of sectors may be employed. There are two sectors 13 which are of such transmission characteristics that the only radiation not absorbed is the red light from the source. Two other sectors 14 are of such transmission characteristics that they transmit only blue light from the source. These filter sectors will hereinafter be referred to as the red and blue filters. The disk 12 is fixed at the end of a shaft 22 rotated by a motor 23.

The latter may be any suitable type depending upon the available energy for motive power. The speed of the motor is not critical and should be chosen in accordance with the admittance characteristics as to frequency of the electrical network of the transducer.

A circuit suitable to perform the function of the transducer in the block diagram of Figure 1 is the logarithmic amplifier described and claimed in my U. S. Patent 2,406,716 in connection with a direct reading densitometer, except for slight modifications in the output circuit thereof. Another logarithmic amplifier may also be used, for example any one of the circuits shown in U. S. Patent 2,413,706, or U. S. Patent 2,492,901, respectively which is referred to in detail in Figure 7.

Continuing with the description of Figure 2, at the opposite side of the disk from the aperture 20 is the phototube 11, the cathode of which is connected to the grid of a thermionic amplifier tube, generally indicated by numeral 24. The phototube 11 may be a type 929 or one having similar characteristics. It should be fully responsive to all colors, that is, should have a response at least as broad as that of the human eye. The tube above mentioned has a range or is adapted to read color temperatures of black bodies from 2500° K. to 25,000° K. This range includes many sources of illumination likely to be used in photographic work including the maximum color temperature generally encountered in sunlight and skylight.

Figure 9:
Figure 9 is a similar scale graduated in units of Kelvin for indicating color temperature.

The basic circuit elements comprise the high value grid input resistor 26 leading to a suitable bias voltage tap of the potentiometer 27. The battery 25 or any suitable source furnishes operating voltage to the phototube 11 and the elements of the vacuum tube 24. The output voltage is taken off across the load resistor 30 in the circuit of the anode 28 and, inasmuch as the D. C. component is not utilized, the indicating meter 29 is connected through an isolating condenser 31. The meter may be any suitable A. C. voltmeter such as a rectifier type, or it may be a vacuum tube type. The meter scale is calibrated in units of Kelvin as seen in Figure 9 for color temperature transformation starting at approximately 2500° Kelvin, and covering a range up to 25,000°.

In operationn, the device is brought into proximity to the light source, the color temperature of which is to be measured, and the disk 16 is rotated at its intended speed. Light enters through aperture 20 and, of course, the effect of the filter sectors 13 and 14 is such that for 90° of rotation effectively monochromatic red light only passes and strikes the cathode of the phototube 11. For the next 90° of rotation of the disk, effectively blue monochromatic light only affects the phototube. The alternation of blue and red light continues to affect the tube 11 and when there is a difference in the intensity level between these colors an alternating current is generated proportional to the intensity of red and blue in the light from the source.

The transformation of the phototube current, as hereinbefore explained, by virtue of the log transfer characteristic of the amplifier into the log ratio results in an indication in units of Kelvin and the color temperature can be read without additional computations.

As examples of filters which may be employed in the disk, Wratten A and C–5 gelatin, color filters have been used with satisfactory results. Any similar filters may be employed, but it must be borne in mind that the primary requisites are that the sectors should transmit a band of spectral energy which is approximately monochromatic light of the proper wavelengths and that the relative or proportionate amount of light transmitted under similar conditions must be substantially the same for each of the colors.

For analyzing colors, the basic part of the instrument is substantially the same except that other filter disks are employed, it being possible to make the necessary change or substitution by so constructing the shaft 19 of motor 20 that the disks may be quickly attached and detached. As an alternative, the sectors or semi-circular filter elements may be so constructed that they are connectable to a rotating frame work permanently attached to the shaft, although it is probably simpler and more satisfactory to make the various disks completely detachable as first mentioned.

Figure 3:
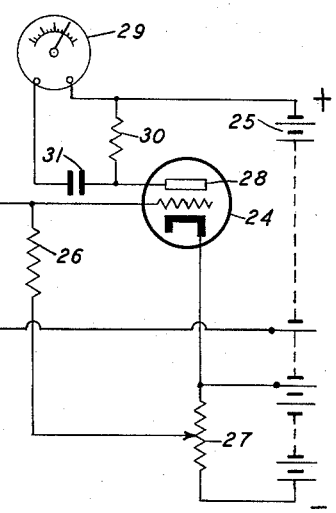
Figure 3 is a curve showing the relative transmission for a filter determining the X function of the trichromatic coefficients.
Figure 3:
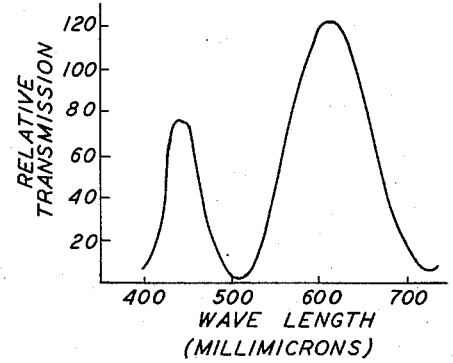
Figure 4:
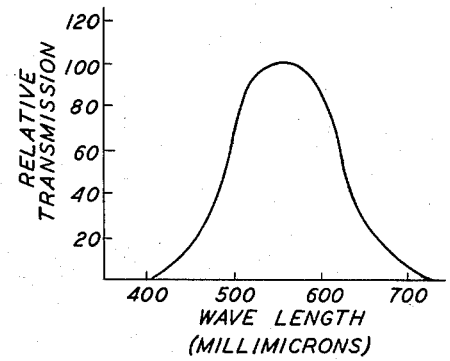
Figure 4 is a similar curve for the Y function.
Figure 5:
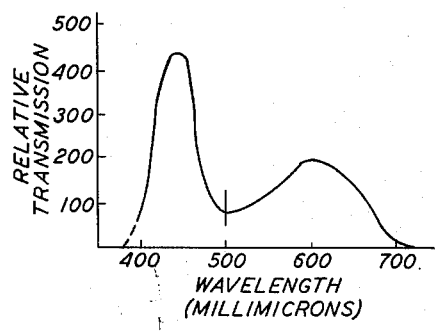
Figure 5 is a curve indicating the transmission characteristics of a filter applicable to the Z function.
Figure 6:
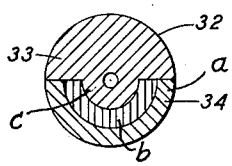
Figure 6 is a diagrammatic illustration of a filter disk provided with portions having transmission factors in accordance with curves of Figures 3, 4, and 5.

Now referring to Figure 6, the filter disk 32 is shown having two segmental portions, one segment 33 is uniform, whereas segment 34 has three concentric portions $a$, $b$, and $c$, respectively. Of these, "$a$" has such spectral transmittance when used in conjunction with the phototube 11 that the spectral response of the latter conforms to the $\overline{Z}$ function; "$b$," in the same manner, has a transmittance to satisfy the $\overline{Y}$ function; and "$c$," being the same as segment 33, has a transmittance to satisfy the $\overline{X}$ function. The curves of these transmittance characteristics are seen in Figs. 3, 4 and 5. At one-half revolution of the disc 32, light reaches the phototube 11 only through segment 33. On the next half revolution, the light reaches the phototube 11 simultaneously through the three concentric portions. The modulation of the light beam consequently results in an input voltage to the amplifier alternately corresponding to the X and $X+Y+Z$ functions. The logarithmic response of the amplifier in effect subtracts one from the other and thereby solves the division $$\frac{X}{X+Y+Z}$$

which gives the trichromatic coefficient for $x$. There are two such disks employed in the measuring arrangement. In one disk, segment 33 is used for the X function for the $x$ trichromatic coefficient. This filter is actually a magenta filter having a spectral transmission curve, such as shown in Figure 3. The transmission characteristics are such that when used with a particular phototube (specifically an RCA type C–7104 photomultiplier tube), the net response or current from that tube duplicates the X tristimulus function.

In the second disk, on the other hand, the segment 33 is of such filter material which correspond to the Y function having transmission and absorption characteristics as shown in the curve of Figure 4. The segment 34 in this disk is exactly the same as described above since change of filter disks is needed only for the X and Y denominators.

In actual practice, these filters may be of gelatin or of any other filter material practicable for use, and while special filters are to be preferred, certain commercially available filters may be employed to give very nearly the desired relative transmission values. For example, the following may be used.

*For the X function*

Sector 33 may be made of:
    Wratten 34 (D-light)+86A (Photometric Yellowish), or
    Wratten 30 (Rose Bengal)+39 (Duplicating)+38A (Dark Toluidine Blue)+86A, or
    Jena GG3+Jena BG12.

*For the Y function*

Sector 33 may be made of:
    Wratten 86 (Daylight to Tungs. 2360)+79 (Acetylene to Daylight, Photographic), or
    ½ density Wratten 52 (½ Naphthol Green 2)+86B (Photometric Yellowish).

*For the X+Y+Z function*

Sector 34 may be made of:
    Wratten 2A+¼ density 67 (Filter Blue Green)+ Ansco color correction CC36 magenta and CC45 cyan.

Any of the above filters are also suitable for the disk 32, forming the various sectors and concentric rings thereof; for example, sector 34 of the disk 32 may be any one of the filters listed for the $X+Y+Z$ function.

In some instances the total transmission of the filters in the disk may differ, i. e., for the same energy to be transmitted. If so, a neutral density filter is added to those filters for which it is necessary to increase density (cut down transmission) so as to bring the total level of response to the desired value relative to that of the other segments or filters.

In practice, light transmitted by or reflected from a source, the $x$ and $y$ tristimulus values of which are to be determined, enters the aperture and, as selectively attentuated by the filter disk combination, affects the phototube-amplifier-meter circuit. As the filter combinations are rotated, the meter shows the difference between the logarithm of one function and the logarithm of the other function. In the case of the first disks, this value is:

$x$=antilog
$$\left\{\left[\log\int_0^\infty (X)_\lambda . T_\lambda d\lambda\right]-\left[\log\int_0^\infty (X+Y+Z)_\lambda . T_\lambda d\lambda\right]\right\}$$
where $T\lambda$=the transmittance or reflectance of the specimen at a given wavelength $\lambda$.

$X\lambda$=the relative response of the X phototube-filter combination at the same wavelength $\lambda$.
$Y\lambda$=the relative response of the Y phototube-filter combination at the same wavelength $\lambda$.
$Z\lambda$=the relative response of the Z phototube-filter combination at the same wavelength $\lambda$.
$d\lambda$=infinitesimal increment of wavelength $\lambda$.
$x$=the antilog of the difference between the logarithm of the area under the curve $(X\lambda . T\lambda)$ vs. $\lambda$ and the logarithm of the area under the curve $(X+Y+Z) . T$ vs.

In specifying color according to the International Commission on Illumination's chromaticity diagram, it is customary to plot the values $x$ and $y$ where:

$$x = \frac{X}{X+Y+Z}$$

and $$y = \frac{Y}{X+Y+Z}$$

Since the disk for the $x$ coefficient determination is rotated and the light transmitted by the alternating sectors is caused to affect the circuit just as in the case of the color temperature determination, the logarithmic division of the terms of the fraction necessary for determining the logarithm of the $x$ coefficient is continuously shown at the meter. Of course, the meter is preferably graduated to a scale which directly indicates the antilogarithm or the coefficient itself.

When the Y filter is inserted the same relationship applies, that is, the circuit continuously performs the logarithmic division of the terms Y over $X+Y+Z$. The meter excited by that current proportional to the difference of the logarithms indicates on the $x$ or $y$ scale, the coefficient $y$. The coefficients having been established for a particular specimen, its position may be plotted on the usual chromaticity diagram.

Figure 8:
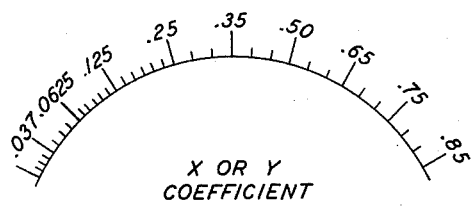
Figure 8 shows the scale of an indicating instrument in terms of X or Y coefficients.

In Figure 8 the system of graduating the $x$ and $y$ scale is shown. The scale includes the values normally capable of being plotted on a chromaticity diagram and is logarithmic.

Figure 7:
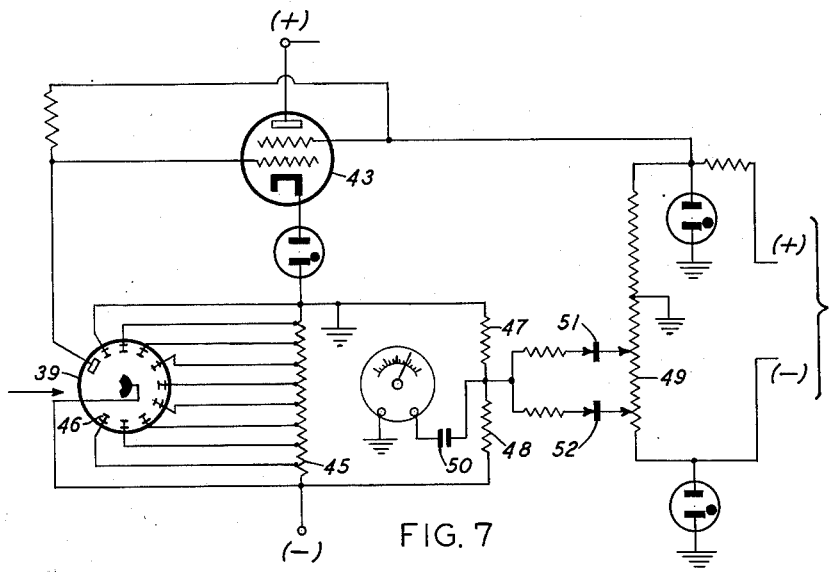
Figure 7 is a schematic circuit diagram of a logarithmic amplifier which may take the place of the transducer of Figure 1 or the amplifier in Figure 2.

Since the filters sometimes necessarily have considerable density, greater phototube response (greater sensitivity) is to be desired. In Figure 7 the circuit shown has many thousandfold greater sensitivity, a more linear response of the multiplier tube to change in radiation received, and a more precise logarithmic relationship. The latter leads to less error in indication at the meter providing a theoretically correct logarithmic graduation is used.

This circuit is the one referred to in U. S. Patent 2,492,901. In its essential elements, it consists of photomultiplier tube 39 which may be an RCA type C-7104 and a control tube 43 which regulates effective voltage drop across the voltage divider 45, from which the dynode elements 46 receive operating potentials. The output is taken off effectively between this divider and a network comprising the resistors 47 and 48 which derive compensating voltage from the operating voltage source indicated here by the "positive" and "negative" terminals, feeding a voltage divider 49. Only the A. C. component of the output voltage is utilized and here, also, as in the circuit of Figure 2 a condenser 50 provides isolation of the D. C. component in the meter connection.

The regulating function of the control tube 43 gives the log transfer characteristics in that the effective dynode voltages are decreased with the increase of cathode excitation of the phototube 39 and vice versa. Additional corrective action as to the logarithmic response is furnished by the unilateral conducting devices 51 and 52 which feed the compensating network referred to above. The above described circuit is exceptionally accurate as a logarithmic amplifier and eminently suited for the present application. The operation is the same, as far as the measuring arrangement is concerned, as described in connection with Figure 2 and need not be repeated here.

While one embodiment and a modification of the invention have been disclosed, it is to be understood that the inventive concept may be carried out in a number of ways. This application is, therefore, not to be limited to the precise details described, but is intended to cover all variations and modifications thereof falling within the spirit of the invention and the scope of the claims.

This application is a division of my copending application, Serial No. 89,339, filed April 23, 1949, now U. S. Patent 2,648,253.

I claim:

1. Apparatus for determining the trichromatic coefficients of light radiated from an object in accordance with the functions defined by the International Commission on Illumination which comprises in combination photoelectric means for receiving a beam of light to be analyzed, a composite filter disc having a segmental portion of such spectral transmittance in conjunction with said photoelectric means that the resultant spectral response of said photoelectric means conforms to the X function and having another portion giving the spectral response which conforms to the $X+Y+Z$ functions, said other portion comprising three concentric segments, each representing the relative transmission of the X, Y, or Z functions, means for rotating said disc, thereby alternately and successively interposing in said beam, between said light and said photoelectric means, said portions thereby modulating said beam in accordance with the characteristics of said functions, a circuit for amplifying the current of said photoelectric means resulting from said modulation, said circuit having logarithmic transfer characteristics whereby the output represents the logarithm of the input, and an instrument connected to said amplifier for indicating the output thereof and having a logarithmic scale graduated in terms of $x$ chromatic coefficients.

2. Apparatus for determining the trichromatic coefficients of light radiated from an object in accordance with the functions defined by the International Commission on Illumination which comprises in combination photoelectric means for receiving a beam of light to be analyzed, a composite filter disc having a segmental portion of such spectral transmittance in conjunction with said photoelectric means that the resultant spectral response of said photoelectric means conforms to the Y function and having another portion giving the spectral response which conforms to the $X+Y+Z$ functions, said other portion comprising three concentric segments, each representing the relative transmission of the X, Y, or Z functions, means for rotating said disc, thereby alternately and successively interposing in said beam, between said light and said photoelectric means, said portions thereby modulating said beam in accordance with the characteristics of said functions, a circuit for amplifying the current of said photoelectric means resulting from said modulation, said circuit having logarithmic transfer characteristics whereby the output represents the logarithm of the input and an instrument connected to said amplifier for indicating the output thereof and having a logarithmic scale graduated in terms of $y$ chromatic coefficients.

References Cited in the file of this patent

UNITED STATES PATENTS

| | | |
|---|---|---|
| 1,898,219 | Sharp | Feb. 21, 1933 |
| 2,162,529 | Dawson | June 13, 1939 |
| 2,203,036 | Briessen et al. | June 4, 1940 |
| 2,313,666 | Peterson | Mar. 9, 1943 |
| 2,413,706 | Gunderson | Jan. 7, 1947 |
| 2,417,023 | Sweet | Mar. 4, 1947 |
| 2,475,108 | Nicholson | July 5, 1949 |
| 2,598,783 | Gittus | June 3, 1952 |

FOREIGN PATENTS

| | | |
|---|---|---|
| 324,351 | Great Britain | Jan. 20, 1930 |
| 446,016 | Great Britain | Apr. 22, 1936 |